United States Patent [19]

Wolfthal

[11] 4,173,824

[45] Nov. 13, 1979

[54] APPARATUS FOR AUTOMATICALLY ASSEMBLING ARTICLES, SUCH AS CLIPS

[75] Inventor: Maurice Wolfthal, Ossining, N.Y.

[73] Assignee: Stewart Stamping Corporation, Yonkers, N.Y.

[21] Appl. No.: 851,516

[22] Filed: Nov. 14, 1977

[51] Int. Cl.$^2$ .............................................. B23P 19/04
[52] U.S. Cl. ....................................... 29/783; 29/513; 29/785; 29/788; 29/796
[58] Field of Search ................. 29/783, 785, 789, 788, 29/792, 796, 285, 513

[56] References Cited

U.S. PATENT DOCUMENTS

| | | | |
|---|---|---|---|
| 1,616,641 | 2/1927 | Tainter | 29/789 X |
| 1,740,177 | 12/1929 | Horton et al. | 29/785 X |
| 1,861,889 | 7/1932 | Stall | 29/789 X |
| 3,781,967 | 1/1974 | Fisher | 29/783 X |

Primary Examiner—Charlie T. Moon
Attorney, Agent, or Firm—Martin G. Raskin

[57] ABSTRACT

An apparatus and method for assembling articles such as clips, comprising first and second components formed from metallic sheet stock, said apparatus including an outer annular member and second and third dial members mounted within the annular member, the annular and dial members being rotatably mounted in a synchronized manner associated with the cycling of a die press. Pairs of article components are continuously punched with each press cycle and pushed through an opening in a die block to be received and held at rotatably indexing receiving stations in a horizontal orientation in respective ones of a plurality of clamping assemblies formed in each of the outer annular member and second inner dial member, respectively.

As the annular and second dial member rotatably index, the respective clamping assemblies pivot unit the first and second article components are held in a vertical orientation.

Each second article component is transferred to one of a plurality of clamping assemblies provided in the third inner dial member thereby reversing the article component with respect to its outwardly facing surface.

Successive pairs of first and second article components now held in the clamping assemblies of the outer annular member and third inner dial member respectively are indexed into confronting relationship at an assembly station wherein means are provided for assembling the article with subsequent finishing operations and finally, ejection.

22 Claims, 27 Drawing Figures

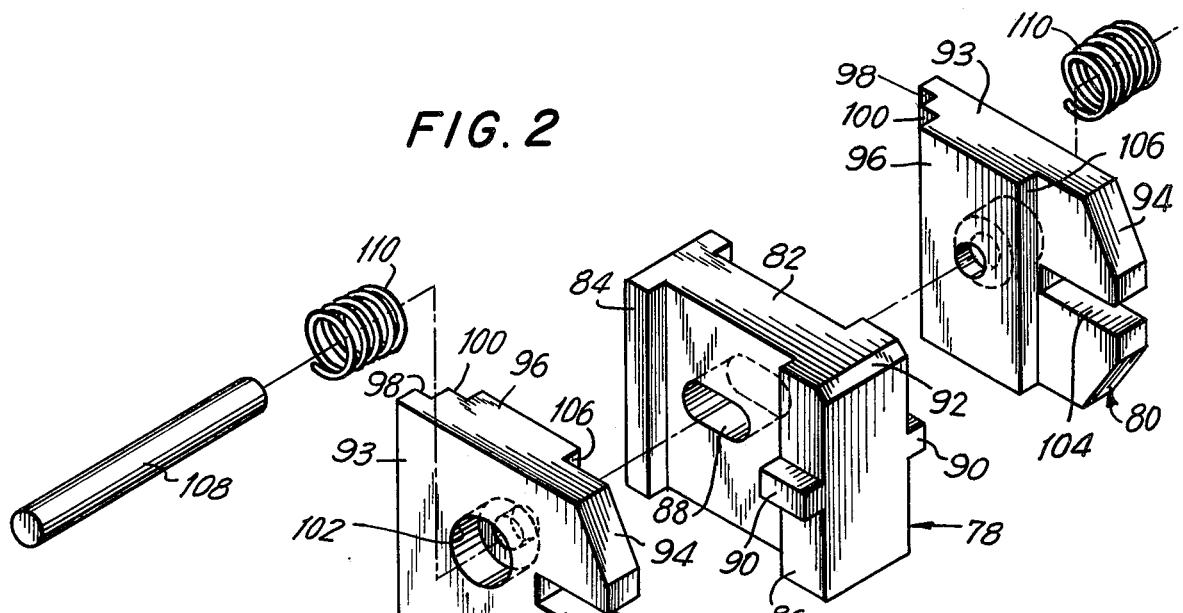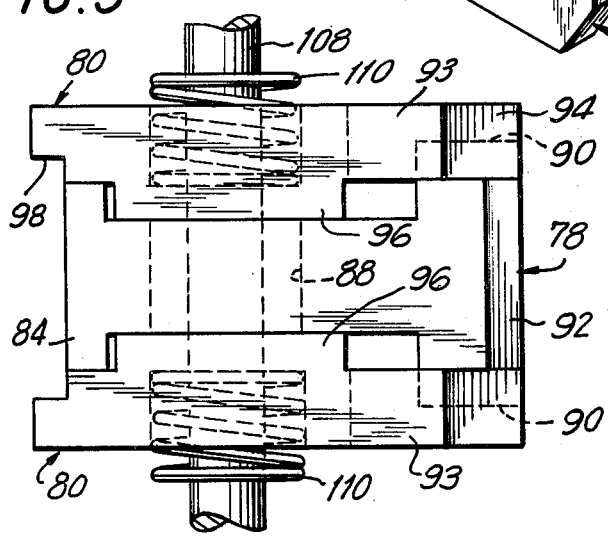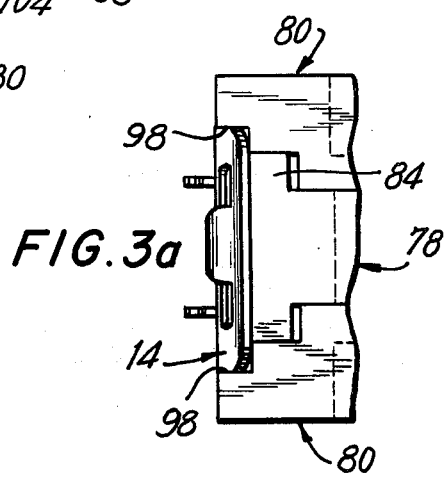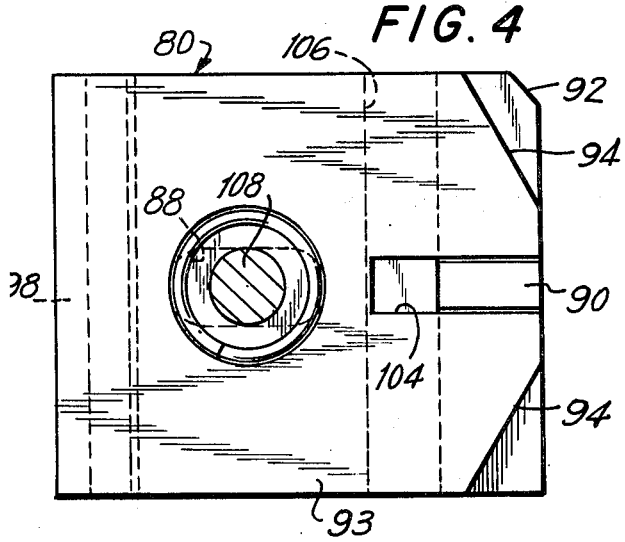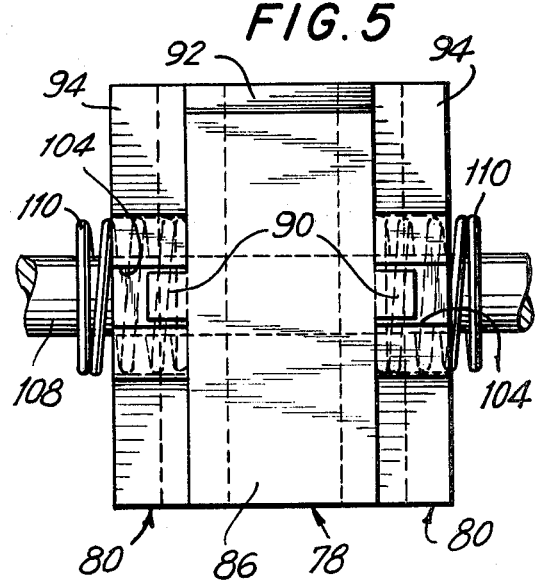

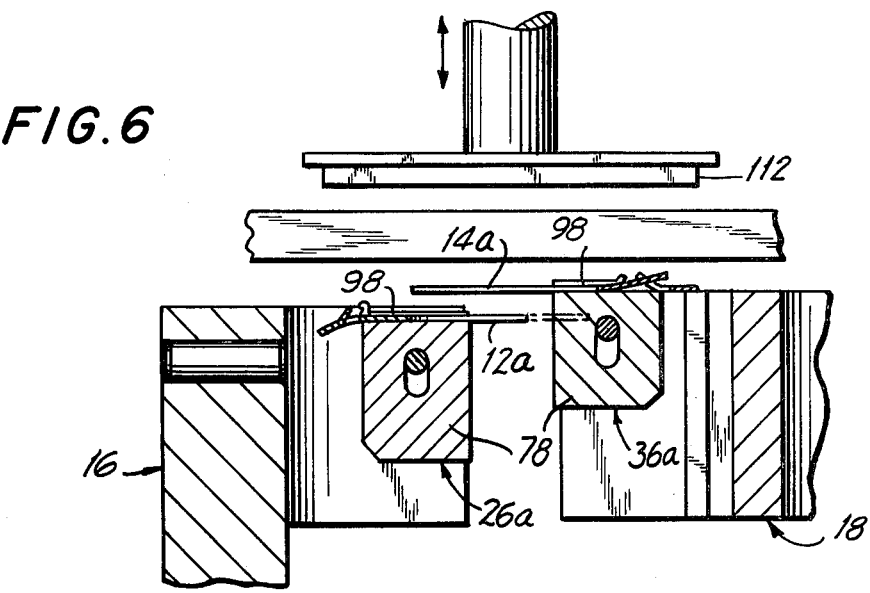
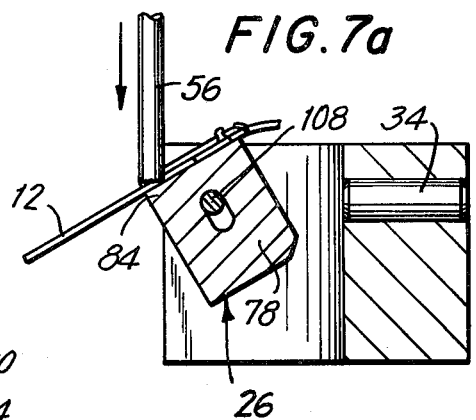
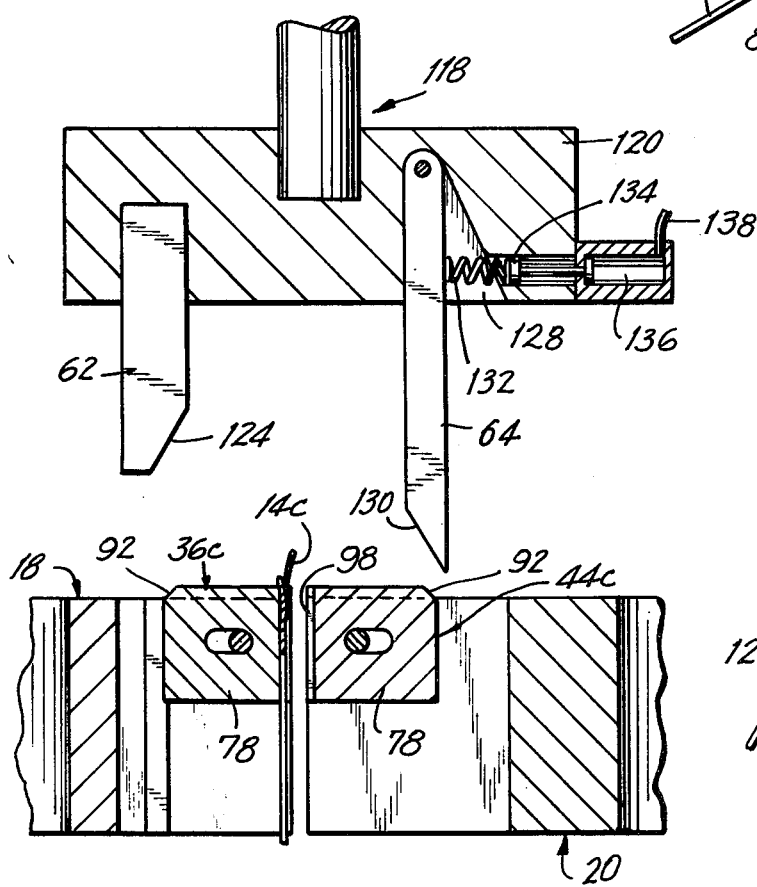
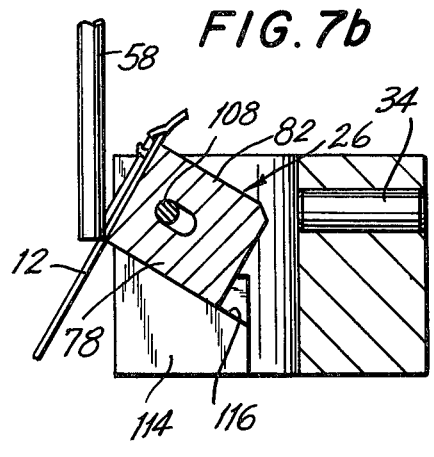

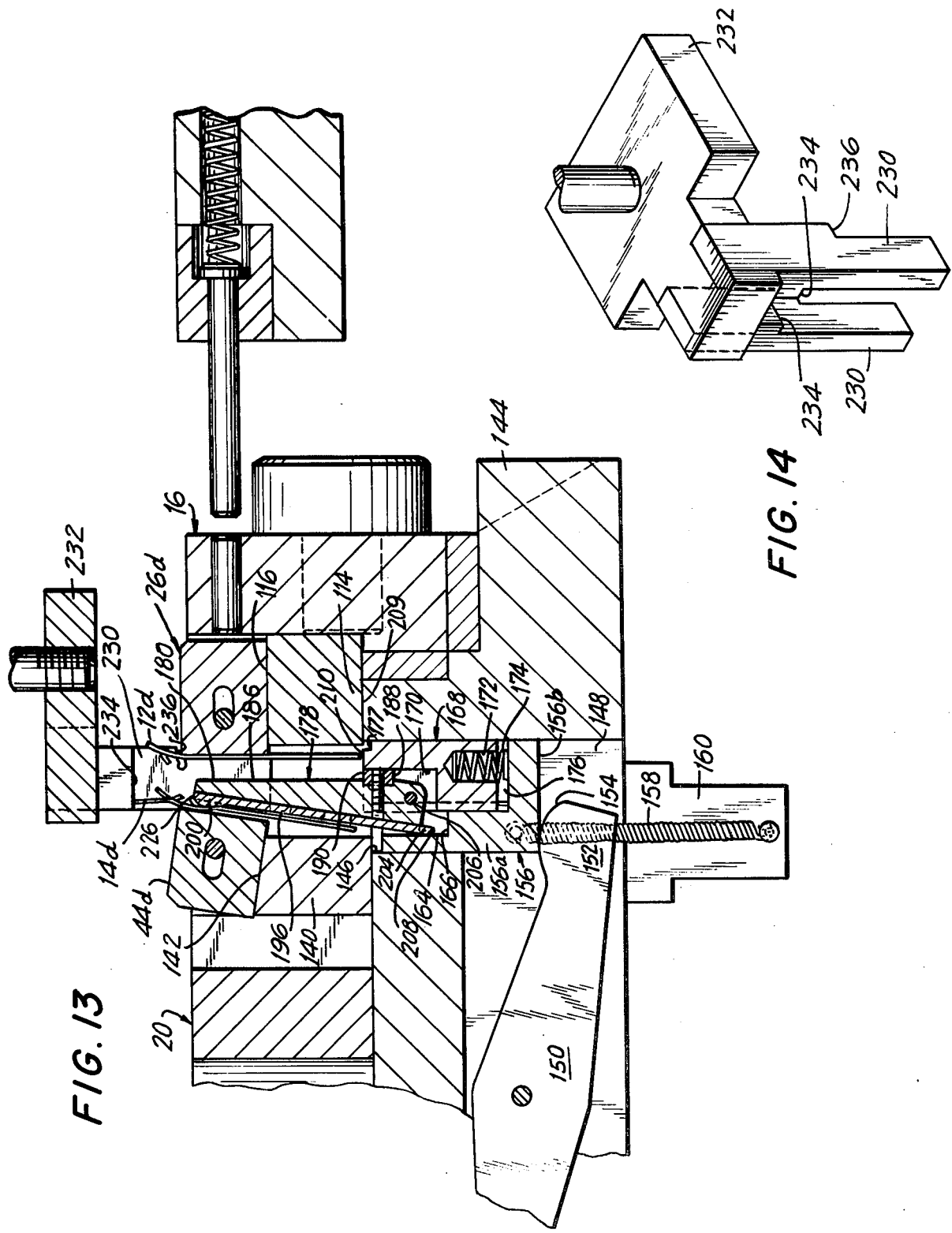

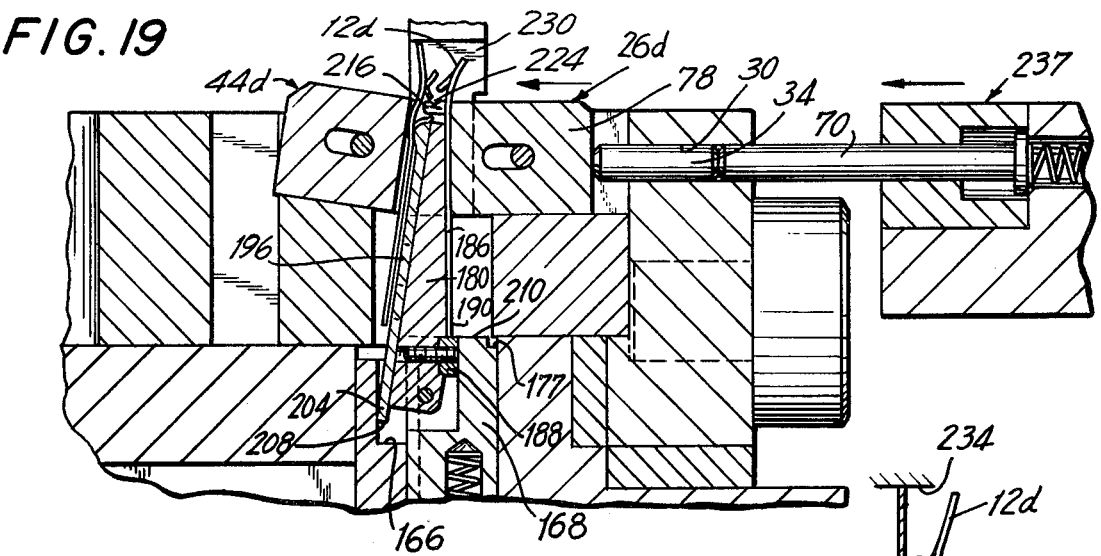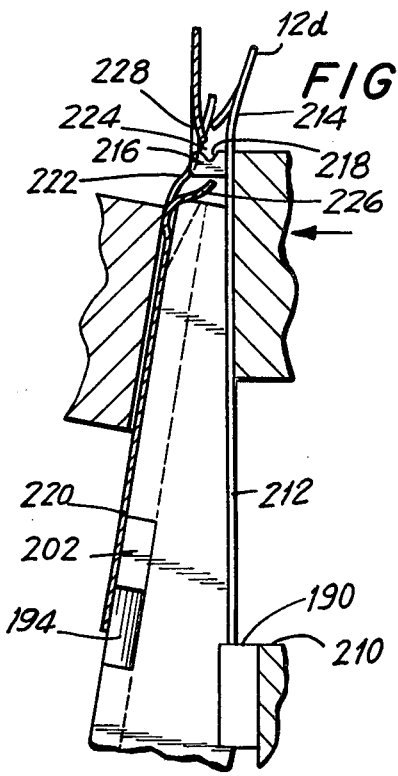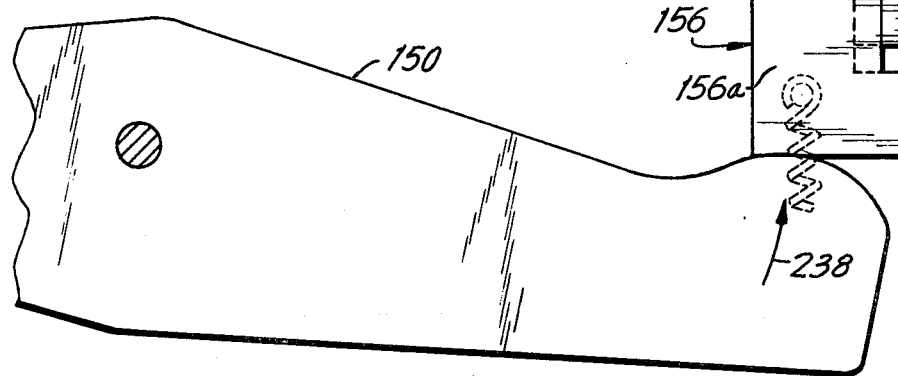

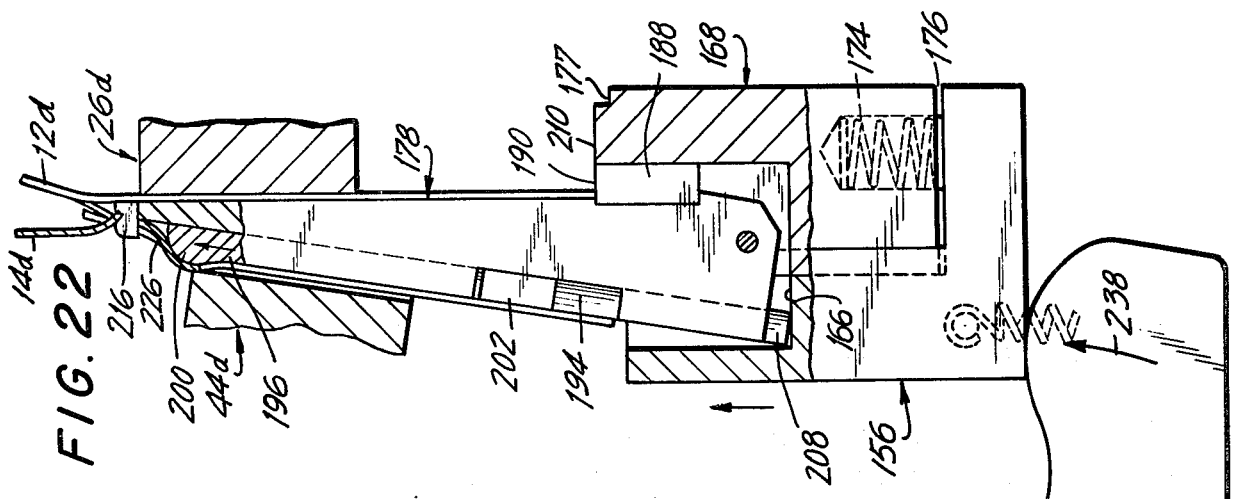
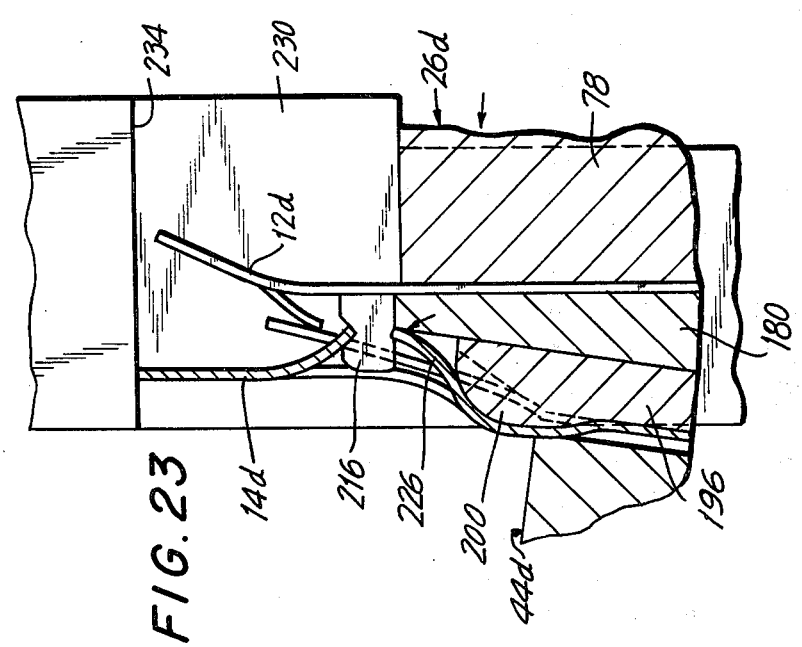
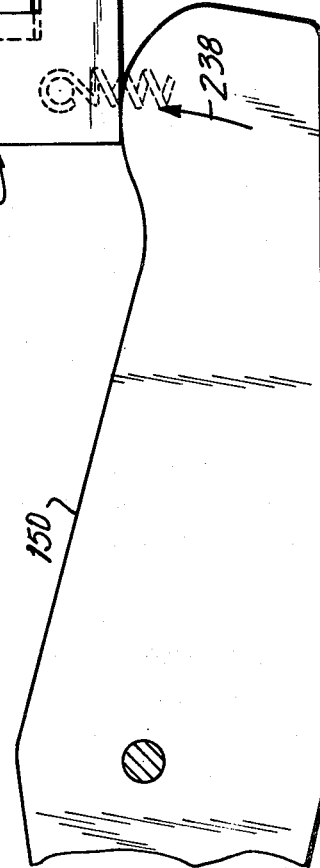
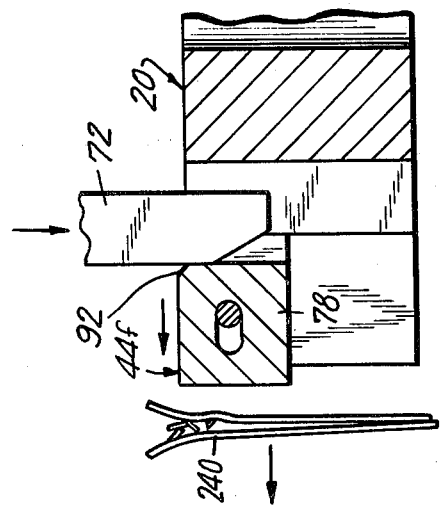

APPARATUS FOR AUTOMATICALLY ASSEMBLING ARTICLES, SUCH AS CLIPS

BACKGROUND OF THE INVENTION

This invention relates generally to a method and apparatus for assembling multi-component articles and more particularly, to a method and apparatus for automatically assembling articles, such as clips, whose components are punched from sheets of metallic stock.

Conventional methods and apparatus in present use for assembling clip type articles whose components are punched from a sheet of metallic stock are not entirely satisfactory for the reason that so far as applicant is aware, manual intervention is required in all such methods and apparatus in at least one phase of the construction of the article. For example, in the manufacture of a currently popular hair clip, each clip component is punched from a separate die thus requiring two separate presses. The components are then manually placed into respective recesses on moving belts. The moving belts transport the respective clip components to an assembly station wherein the clip components are assembled to form the clip. Thus, expensive and time consuming manual labor has been required in the assembly of such articles in the past.

Various attempts have been made to automate methods of assembling articles comprising a pair of components. For example, U.S. Pat. Nos. 3,742,575; 3,724,399; 3,378,908; 2,972,184; 1,830,021; and 1,616,641 relate to various apparatus which automatically assemble various articles by means of rotatable members which broadly interact with each other in a cooperative manner. For example, U.S. Pat. No. 3,724,339 to Metzinger et al. discloses apparatus for automatically assembling articles such as filter tips within cigar tip holders. However, such prior art apparatus are not suitable for assembling articles whose components are formed from metallic sheet stock which obviously require special handling not required in the construction of other articles.

Therefore, it can be seen that a need exists for an apparatus and method for assembling articles whose components are formed from a sheet of metallic stock in an automatic manner which requires no manual intervention.

SUMMARY OF THE INVENTION

Accordingly, one object of the present invention is to provide a new and improved method and apparatus for the assembly of articles in an automatic manner without the necessity for manual intervention.

Another object of the present invention is to provide a new and improved method and apparatus for automatically assembling articles formed of two components punched from sheets of metallic stock.

Still another object of the present invention is to provide a new and improved method and apparatus for the assembly of articles and, in particular, for the assembly of hair clips, in an automatic manner without the necessity for manual intervention.

The apparatus of the present invention has a number of cooperating and timed elements for receiving and indexing the article forming components successively to a number of stations wherein the successive operations are carried out in timed relation in a rapid and automatic manner.

The apparatus of the present invention includes a complete machine made up of a number of cooperating elements or mechanisms as well as various subcombinations thereof which, when used together, also form new machines.

In accordance with one embodiment of the present invention, which is especially adapted for the assembly of clips, such as hair clips, these and other objects are attained by providing a rotatably mounted annular member having a plurality of clamping assemblies spaced around the inner periphery thereof, each being pivotally mounted about a horizontal axis. A pair of rotatably mounted dial members denominated second and third dial members are mounted in the area defined within the annular member. The second dial member has a plurality of clamping assemblies spaced around the periphery thereof each clamping assembly being pivotally mounted about a horizontal axis. The third dial member also has a plurality of clamping assemblies pivotally mounted around the periphery thereof.

The annular member and second dial member are located so that during their rotation, which is synchronized with the cycling of a punch press, successive pairs of clamping assemblies index beneath the die block opening to receive successive pairs of first and second clip components, each pair of components being punched with each cycle of the press. Each such pair of clip components are received in the pair of clamping assemblies then located beneath the die block opening, the first clip component being received in the annular member clamping assembly and the second clip component being received in the second dial member clamping assembly. The annular member and second dial member then synchronously rotatably index until the next pair of clamping assemblies of the respective members are similarly located beneath the die block opening whereupon another pair of clip components are punched and received therein.

The third dial member is located and adapted to rotatably index so that each clamping assembly mounted in it is continuously and sequentially brought into confronting relationship at a transfer station with a first dial member clamping assembly which is then holding a second clip component as described above. At this time the second clip component is transferred via transfer apparatus to the third dial member clamping assembly.

The third dial member itself rotatably indexes in synchronous fashion with the cycling of the press so that the second clip components now held in its clamping assemblies are each continuously and sequentially indexed into confronting relationship at an assembly station with a respective first clip component held in a clamping assembly of the annular member which has been rotatably indexed to the assembly station. The first and second clip components are then assembled to each other via assembly apparatus with the assembled clip being held in the third dial member clamping assembly. Subsequent to assembly, the third dial member continues to rotatably index whereupon the assembled clip is subjected to various finishing operations and then ejected from the third dial member clamping assembly.

The entire assembly operation is accomplished without the necessity for manual handling of the individual clip components and, additionally, it is noted that the use of the pair of inner dial members accomplishes the reversal of the burr side of the second clip component so that all major burrs are on the outside of the assembled clip where they are removable in subsequent tumbling and other post assembly finishing steps.

DESCRIPTION OF THE DRAWINGS

The present invention will be readily understood by reference to the following description in conjunction with the drawings in which:

FIG. 2 is an exploded perspective view of a typical clamping assembly for use in the annular and second dial members;

FIG. 3 is a plan view of the clamping assembly in assembled form;

FIG. 3a is a plan view of a portion of a clamping assembly with a clip component being held therein;

FIG. 4 is a side view of the clamping assembly shown in FIG. 3;

FIG. 5 is rear view of the clamping assembly shown in FIG. 3;

FIG. 6 is a section view taken along line 6—6 of FIG. 1 illustrating the clip components being punched and received within the clamping assemblies in the annular and second dial members;

FIG. 7a is a section view taken along line 7a—7a of FIG. 1 illustrating the initiation of pivotal movement of a clamping assembly in the annular member;

FIG. 7b is a section view taken along line 7b—7b of FIG. 1 illustrating further pivotal movement of the clamping assembly;

FIG. 8 is a section view taken along line 8—8 in FIG. 1 futher illustrating apparatus for transferring the third clip component from the second dial member to the third dial member;

FIG. 13 is a section view taken along line 13—13 of FIG. 1 illustrating the assembly apparatus of the present invention;

FIG. 14 is a perspective view of the guide member of the assembly apparatus of the present invention;

FIG. 19 is a section view of the annular and third dial members and a portion of the assembly apparatus during assembly of the article;

FIG. 20 is a detail view of FIG. 19 illustrating progressive assembly;

FIG. 21 is a detail view of the assembly apparatus wherein assembly has still further progressed;

FIG. 22 is a detail view of the assembly apparatus wherein assembly has progressed yet further;

FIG. 23 is a detail view of the assembly apparatus wherein the assembly has been completed; and FIG. 24 is a section view along line 24—24 of FIG. 1 illustrating ejection of the assembled clip from the third dial member.

DESCRIPTION OF THE PREFERRED EMBODIMENT

Figure 1A:
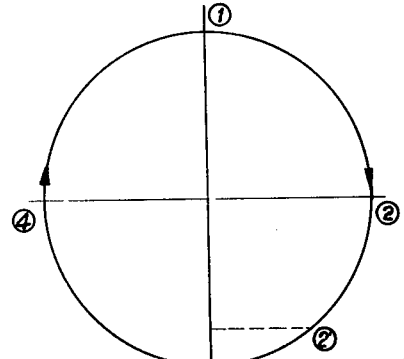
FIG. 1a is a diagram of a typical cycle of a die press.
Figure 1:
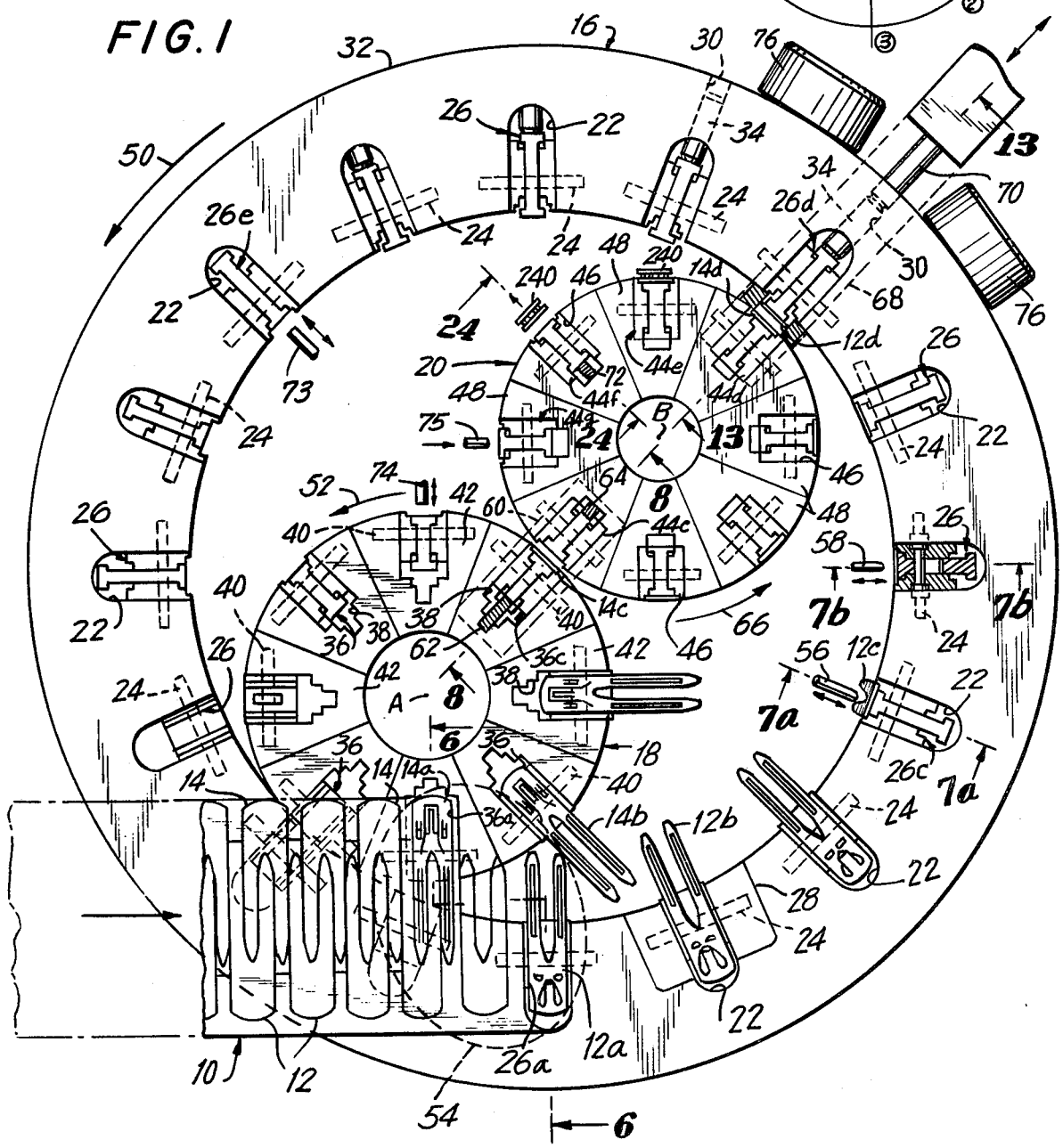
FIG. 1 is a schematic plan view of the apparatus of the present invention.

Referring to FIG. 1, the particular illustrated embodiment of the present invention is intended for use in the manufacture and assembly of hair clips as shown in U.S. Pat. No. 3,991,774. By virtue of the unique construction of such hair clip, components may be punched from a single sheet of metallic stock, denoted 10, in a progressive die which operates in a die set mounted in a punch press. The first and second clip components, 12, 14, respectively, are formed from stock 10 in opposed, interlocked relationship in an alternating manner. However, it is understood that the apparatus and method of the present invention may be adapted for use in the manufacture and assembly of other type clips manufactured from one or more sheets of metallic stock from which the clip components are punched. Additionally, it is understood that the present invention may be utilized in the manufacture and assembly of articles other than clips which comprise a pair of components. Further, the present invention may be adapted for the manufacture and assembly of articles formed from three components, two of which may be affixed to each other by the third.

A conventional die set (not shown) is provided with a cavity of sufficient size to have mounted therein three rotatable members, namely, a first annular member 16, a second dial member 18 and a third dial member 20.

In the present embodiment, the centers of rotation, A, B, of the second and third dial members 18, 20 lie on a diameter of first annular member 16.

Each of the first annular and second and third dial members include a plurality of clamping assemblies mounted in cavities formed in the peripheries thereof. More particularly, first annular member 16 has sixteen cavities 22 uniformly spaced along the inwardly facing periphery thereof, each of the cavities having a transversely extending slot 24 formed therein. A clamping assembly 26, described in detail hereinbelow, is pivotally mounted within each cavity 22 about a pin which is received in cavity slot 24. Retaining plates 28 (only one of which is shown in FIG. 1) are affixed to the upper surface of annular member 16 over each of the cavities overlying the ends of slot 24 thereby retaining the clamping assemblies 26 pivotally mounted therein.

For purposes which will be discussed hereinbelow, a radially extending bore 30 (only two shown) is formed rearwardly of each clamping assembly 26, each bore having an inner end which opens into a respective cavity 22 and an outer end which opens onto the outer edge surface 32 of annular member 16. A stub rod 34 is slidably located in each of the bores 30.

In the present embodiment, the second dial member 18 has eight clamping assemblies 36 pivotally mounted in cavities 38 formed in the outer periphery thereof in a manner similar to clamping assemblies 26 of the first annular member 16. Thus, pivot pins are received within slots 40 provided in cavities 38, the clamping assemblies 36 being retained in their respective cavities by the provision of overlying retaining plates 42.

According to the present embodiment, third dial member 20 also has eight clamping assemblies 44 pivotally mounted in cavities 46 formed in the outer retaining plates 48. However, as described below, whereas clamping assemblies 26, 36 are mounted for 90° pivotal movement about their axes, the pivotal movement of clamping assemblies 44 is limited to a rotation of about 10° by various apparatus described in detail hereinbelow.

Generally, the clamping assemblies 26, 36 and 44 in first annular and second and third dial member 16, 18, 20 respectively, each include a pair of opposed clamping portions, described in detail hereinbelow, adapted to hold the first clip component 12 in the case of clamping assemblies 26 and second clip components 14 in the case of clamping assemblies 36 and 44. Each clamping assembly further includes a pusher member, described below, which upon actuation, ejects the particular clip component (or assembled clip) clamped in that particular clamping assembly. The elements comprising these clamping assemblies are formed with close tolerances so that the respective clip components are held or ejected thereby with great precision.

A general description of the operation of the assembly will best serve to describe the functional inter-relationship of the components thereof whose structure will be described in greater detail hereinbelow. The first annular member 16 and second dial member 18 are located so that during rotation, pairs of respective clamping assemblies 26, 36 continuously and sequentially index beneath an opening in the die block through which pairs of first and second clip components 12, 14 are successively die punched from metallic sheet stock 10. In other words, with each cycle of the punch press, a pair of first and second clip components 12, 14 are pushed through the die block opening and received in clamping assemblies 26, 36 respectively. With the next subsequent cycle of the press, the first annular and second dial members rotatably index until the next clamping assemblies 26, 36 are located beneath the die block opening to receive the next pair of clip components punched.

More particularly, referring to FIG. 1a, a typical cycle of the die press is diagrammatically illustrated. Beginning at the point denoted 1 where the press is at its uppermost position (top dead center), the press moves downwardly through its midway point, denoted 2, and reaches its lowermost point, denoted 3 (bottom dead center) whereupon its upward motion is initiated. The actual punching of the stock occurs during the latter part of the downward movement of the press, viz, at the point denoted 2'. The press moves upwardly through its midway point, denoted 4 and finally again reaches top dead center, denoted 1. That portion of the press cycle wherein the press moves upwardly from point 4 to point 1 and then downwardly from point 1 to point 2 is referred to as the top half of the press cycle. Similarly, the portion of the press cycle wherein the press moves downwardly from point 2 to point 3 and then upwardly from point 3 to point 4 is referred to as the bottom half of the press cycle.

Generally, the three rotatable members index during the top half of each cycle of the press and remain stationary during the bottom half of the press cycle. All clip component transfer and assembly operations occur during the bottom half of the press cycle, i.e., when the rotatable members are stationary.

Referring to FIGS. 1 and 6, in the bottom half of the press cycle shown, a first clip component, denoted 12a, is punched and pushed through the die block opening and received within the clamping assembly, denoted 26a. Similarly, simultaneously, a second clip component, denoted 14a, is being punched and pushed through the die block opening and received within the clamping assembly, denoted 36a. As the bottom half of the press cycle is completed and the top half begins, the first annular and second dial members rotatably index in the directions denoted by arrows 50, 52, respectively, until the first pair of clip components have indexed into positions denoted by clip components 12b, 14b, the next pair of clamping assemblies indexing into position beneath the die block openings. Thus, each subsequent cycle of the press will accompany a rotatable indexing of the first annular and second dial members to the next position.

As seen in FIGS. 1 and 6, the first and second clip components 12a, 14a, upon being received in clamping assemblies 26a, 36a, are horizontally oriented. Thus, at the receiving station, which may be defined as the area enclosed by dotted line 54 (FIG. 1), the clip components are horizontally oriented. In order to accomplish the assembly of a clip, in the present embodiment, the clip components must be brought into opposed, vertical relationship. Toward this end, means are provided to pivot clamping assemblies 26 and 36 until the clip components carried thereby are brought into a substantially vertical orientation. Thus, reciprocating rods 56, 58, described hereinbelow, impact against clamping assemblies 26 at a point offset from their pivot pins to pivot them until first clip components 12 attain a vertical orientation. Additional camming surfaces, described hereinbelow, are utilized to assure precise orientation. Similar apparatus (not shown) are associated with second dial member 18 to pivot clamping assemblies 36 until the second clip components 14 attain a vertical orientation. As will be seen, clamping assemblies 44 of third dial member 20 pivot from a position wherein the clip components held thereby are substantially vertical (the transfer orientation, described below) to a position wherein the clip components are oriented 10° from vertical (the assembly orientation, discussed below). In the present embodiment, this pivotal movement is caused by a camming surface, described below.

The third dial member 20 is located and adapted to rotatably index with the cycling of the press as described above so that the clamping assemblies 44 mounted in it are each continuously and sequentially indexed into confronting relationship at a transfer station, denoted by the dotted line 60, with a second clip component 14c held in a clamping assembly 36c mounted in the second dial member 18. As mentioned above, clamping assemblies 44 mounted in the third dial member 20 are indexed into a position whereby second clip components can be received and held therein in a vertical orientation.

Thus, after several cycles of the press, a second clip component will eventually be indexed into a position within the transfer station area 60 denoted by 14c. A clamping assembly of the third dial member 20, denoted 44c has meanwhile indexed into direct, confronting relationship with clip component 14c. During the bottom half of the press cycle wherein the rotatable members remain stationary, another pair of clip components are punched, and transfer means, described in detail hereinbelow, including cam members 62, 64, transfer the second clip component 14c from clamping assembly 36c in the second dial member 18 to clamping assembly 44c in the third dial member 20 in an extremely precise manner.

Subsequent to transfer to the second clip component 14c from the second dial member to the third dial member, and upon continued cycling of the press, the third dial member 20 continues to rotatably index in the direction of arrow 66. Thus, the second clip component 4c held by clamping assembly 44c in the third dial member is carried thereby until it eventually reaches a position denoted by clamping assembly 44d which holds the second clip component, now denoted as 14d. Meanwhile, the first clip component 12, which was originally punched with clip 14d, has rotatably indexed in clamping assembly 26 until it has reached a position denoted by 12d in clamping assembly 26d. At this point, the first and second clip components 12d, 14d are within an assembly station area, denoted by dotted line 68.

At this point, during the bottom half of the next press cycle, with the rotatable members stationary, the first and second clip components 12d, 14d are assembled to each other by assembly apparatus, described in detail hereinbelow, including piston means 70 which, through cooperation with stub rod 34, ejects the first clip component 12d into association with a fixture assembly (not shown in FIG. 1) and, through the action of various tools described hereinbelow (not shown in FIG. 1), the first clip component 12d is assembled to the second clip component 14d while the latter is held within clamping assembly 44d. Subsequent to assembly, and with the next cycle of the press, the clamping assembly 44d of third dial member 20 indexes to the next location denoted 44f whereupon the assembled clip is ejected from the clamping assembly by ejection means 72, described in detail hereinbelow.

Subsequent to assembly, the clamping assemblies 26 of first annular member 16, are pivoted back to a horizontal orientation as are clamping assemblies 36 in the second dial member 18 so that upon indexing into position beneath the opening in the die block they are capable of receiving a newly punched pair of first and second clip components.

It is noted that in the case of clamping assemblies 26, that subsequent to clip assembly at assembly station 68 and in the case of clamping assemblies 36 subsequent to clip transfer at transfer station 60, the pusher members thereof, described in detail below, are in an extended position and must be returned to their retracted position in order to receive the newly punched pair of clip components at receiving station 54. This is accomplished in the case of clamping assemblies 26 by a reciprocating rod 73 which impacts against the pusher member returning it to its retracted position in the annular ring and in the case of clamping assemblies 36, by reciprocating rod 74 which similarly impacts against and returns that pusher member to its retracted position. The pusher member of clamping assemblies 44 are returned to their retracted position by a similar reciprocating rod 75.

Rotation of the first annular and second and third dial members may be accomplished in any conventional manner readily known to those skilled in the art. For example, the first annular member 16 may be driven by a standard Ferguson indexing drive coupled to the press in a manner so that rotation of the annular and dial members occurs during the top half of the press cycle. The drive comprises a plurality of cam followers, 76 (only two shown in FIG. 1) rotatably mounted on the outer surface of the annular member. The cam followers are driven by a tapered rib on a rotating hub (not shown). The second dial member 18 may be driven by a flexible timing belt coupled to the first annular member by gears with 1:2 ratio. The third dial member may be provided with its own shaft and Ferguson drive mechanism coupled to the press underneath the die set. However, it is understood that any conventional drive mechanism may be utilized so long as precise angular tolerances can be maintained.

CLAMPING ASSEMBLY

Referring to FIGS. 2–5, a typical clamping assembly, for use in the first annular and second and third dial members, is illustrated.

The clamping assembly includes a pusher member 78 interposed between a pair of clamping members 80. The pusher member 78 includes a central shank portion 82, an enlarged shoulder portion 84 at its forward end and an enlarged guide section 86 at its rearward end. Shank portion 82 has a horizontally extending slot 88 formed therethrough. A pair of flanges 90 are provided on the opposed side surfaces of guide portion 86. A beveled camming surface 92 is formed on the upper edge of guide portion 86.

Each of the clamping members 80 includes a substantially rectangular outwardly facing portion 93 having its rear corners cut away as at 94. Inwardly extending from portion 93 is an enlarged body portion 96 which terminates at the forward end of clamping member 80 in a pair of vertically extending shoulders 98, 100. Each clamping member has a countersunk bore 102 formed therethrough and a horizontally extending slot 104 extending from the rear edge of portion 93 to the rearward edge 106 of body portion 96.

In assembly, the pusher member 78 is interposed between the clamping members 80 so that the inner surface of clamping member body portion 96 abuts against the vertical surfaces of the shank portion 82 with flanges 90 of guide portion 86 being slideably received within slots 104 of the clamping members. A pivot pin 108 is passed through the aligned bores 102 and slot 88. Further, a pair of springs 110 are received within bores 102 and retained therein by the countersunk portion thereof so that upon mounting the clamping assembly within its respective cavity as described above, clamping members 80 are normally biased inwardly towards each other.

As best seen in FIG. 3, the lateral extent of clamping body portion 96 is less than the lateral extent of shank portion 82 of pusher member 78 to allow for lateral movement of the pusher member between and relative to the clamping members, such lateral movement being permitted by the slot 88. The direction of such movement is guided by flanges 90 slidably located within slots 104 and pins 108 located in slot 88.

The transverse width of shoulder portion 84 is approximately the same as the transverse space between opposed shoulders 100 of clamping members 80 to allow the pusher member 78 to be retracted into a position as shown in FIG. 3. The opposed shoulders 98 comprise clamping portions of the clamping assembly and are the portions which grasp the edges of the clip components upon the components being received therein as seen in FIG. 3a.

Thus, referring to FIGS. 2–5 in conjunction with FIG. 1, the clamping assemblies 26, 36 and 44 located in the respective cavities of first annular member 16, and second and third dial members 18, 20 comprise structures substantially as shown in FIGS. 2–5. Clamping assemblies 26, 36 are pivotable through 90° whereas clamping assemblies 44 are pivotable through about a 10° arc as will be explained in greater detail hereinbelow. The cut away portions 94 on the clamping members 80 allow for clearance between the clamping assemblies and their respective cavities during pivotal movement as described below. The outer ends of springs 110 bear against the cavity walls while the inner ends bear against the shoulder in the countersunk bores 102 thereby biasing the clamping members 80 toward each other.

PUNCHING OF BLANK AND RECEIPT OF CLIP COMPONENTS

Referring to FIG. 6 in conjunction with FIG. 1, when the clamping assemblies 26, 36 are located beneath the die block opening in position to receive first and second clip components 12, 14, these clamping assemblies are oriented so that the opposed clamping shoulders 98 in each clamping assembly extend in a horizontal direction since the clip components, when pushed through the die block opening are in a horizontal orientation. Thus, the press die 112 punches the respective clip components from the metallic sheet stock 10 and pushes the clip members into the nest defined by the opposed clamping shoulder 98 and forward surface of shoulder portion 84 of pusher member 78. It is noted that the pusher members 78 at this time are fully retracted, i.e., are not within the space defined between opposed clamping shoulders 98, as shown in FIG. 3.

Still referring to FIG. 6 in conjunction with FIG. 1, it is noted that clamping assembly 36a is disposed to the left (as seen in FIG. 1) of and above (as seen in FIG. 6) clamping assembly 26a. This is to avoid any interference between the clip components during subsequent indexing.

After the first and second clip components 12, 14 are received within clamping assemblies 26, 36, respectively during the bottom half of the press cycle, the first annular member 16 and second dial member 18 rotatably index in the directions of arrows 50 and 52 respectively during the immediately subsequent top half of the press cycle. The metallic stock is also fed over the die block to provide for the next stamping operation. The clamping assemblies are rotated one station for each succeeding press cycle.

During the initial indexing of the first annular and second dial members, the clamping assemblies remain in the orientation described above, i.e., with the clamped clip components in a substantially horizontal orientation (hereinafter referred to as the horizontal orientation for the clamping assembly). As explained above, the second dial member clamping assemblies 36 are pivoted to an orientation wherein the second clip components 14 are vertically oriented (hereinafter called the vertical orientation of assemblies) prior to each clamping assembly being indexed into the position denoted as 36c within the transfer station 60. Similarly, the first annular member clamping assemblies 26 are rotatated into a vertical orientation prior to indexing into the position denoted as 26d within assembly station 68.

In the case of clamping assembly 26, referring to FIGS. 7a and 7b, after indexing several positions from 26a, a reciprocally, vertically mounted rod 56 (FIG. 7a) descends until its lower end contacts the inner edge of shoulder portion 84 of clamping assembly 26, thereby causing the same to pivot about pin 108 approximately thirty degrees. Upon clamping assembly 26 indexing to the next position (with the subsequent press cycle), a second reciprocally, vertically mounted rod 58 (FIG. 7b) descends and similarly contacts shank portion 82 rotating the same an additional thirty degrees. The lower surface of clamping assembly 26 then engages a camming surface 116 of cam member 114. The angle of cant of surface 116 gradually decreases until it is horizontal as seen in FIGS. 7b and 19. Thus, after the initial pivotal movement supplied by rods 56, 58 the clamping assembly 26 engages cam surface 116 and is pivoted by it as annular member 16 continues to rotatably index. Surface 116 becomes horizontal at assembly station 68.

The pivoting of clamping assemblies 36 in the second dial member 18 is accomplished in substantially the same manner, i.e., through the use of reciprocally mounted vertical rods (not shown) which contact the shank portion in the same manner as rods 56, 58 and may also include a camming surface similar to the one described hereinabove.

Thus, upon clamping assembly 36 and the second clip component contained therein indexing to the position 36c in transfer station 60 (three cycles of the press after punching), the clip component, denoted 14c, is vertically oriented. At this time the corresponding first clip component has indexed to the position denoted 12c in clamping assembly 26c (FIG. 1).

TRANSFER OF SECOND CLIP COMPONENT FROM SECOND DIAL MEMBER TO THIRD DIAL MEMBER

It is understood that just as first annular and second dial members 16, 18 index with the cycling of the press, third dial member 20 has similarly indexed in the direction of arrow 66. The rotation of the third dial member 20 is such that a clamping assembly 44 indexes into a position within transfer station 60, denoted as 44c, when a second dial member clamping assembly indexes into position 36c.

Referring to FIG. 1 in conjunction with FIGS. 8-12, the transfer of second clip component 14c from second dial member clamping assembly 36c to third dial member clamping assembly 44c is illustrated. Thus, FIG. 8 is illustrative of the relative positions of clamping assemblies 36c and 44c immediately subsequent to indexing into confronting relationship within transfer station 60. Referring to FIG. 8, clamping assemblies 36c, 44c are each in a vertical orientation with their respective pusher members 78 retracted. It may be seen that clamping shoulders 98 on clamping assembly 44c are directly opposed to second clip component 14c.

Positioned immediately above transfer station 60 are transfer apparatus, generally denoted as 118. Transfer apparatus 118 includes a platen 120 adapted for reciprocating movement in conjunction with the movement of the press. More particularly, platen 120 is coupled to the press so as to move downwardly during the lower half of the press cycle, i.e., when the rotatable members are stationary. A first elongate cam member 62 downwardly extends from platen 120 and terminates at its lower end in a beveled cam surface 124. A second cam member 64 is pivotally mounted within a tapered slot 128 formed in platen 120. The lower end of second cam member 64 terminates in a beveled cam surface 130. Further, second cam member 64 is normally maintained in a vertical orientation under the biasing action of a helical spring 132 whose first end bears against the edge of second cam member 64 and whose second end bears against a piston 134 normally maintained in a forward position (as shown in FIG. 8) via a hydraulic cylinder 136. The cam surfaces 124, 130 of first and second cam members 62, 64 respectively, are vertically aligned with bevelled portions 92 of pusher member 78 of the respective clamping assemblies 36c, 44c. It is noted that cam surface 130 of second cam member 64 extends below cam surface 124 of first cam member 62 for reasons which will be made clear below.

Figure 9:
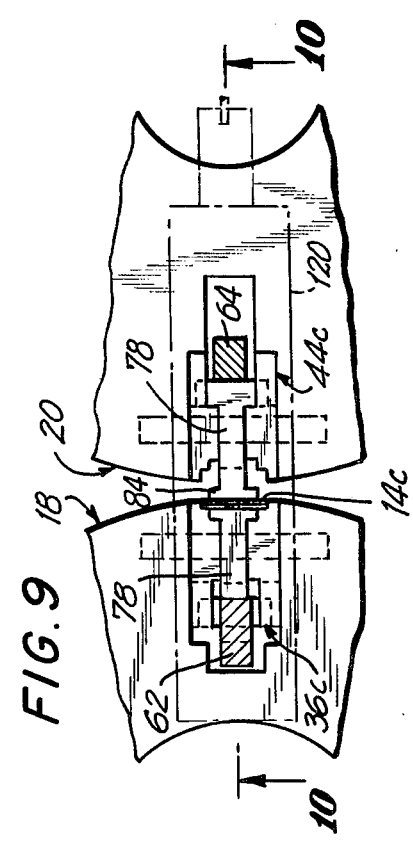
FIG. 9 is a plan view of a portion of the second and third dial members at the transfer station during the initiation of the transfer of the second clip component from the second to the third dial member.
Figure 10:
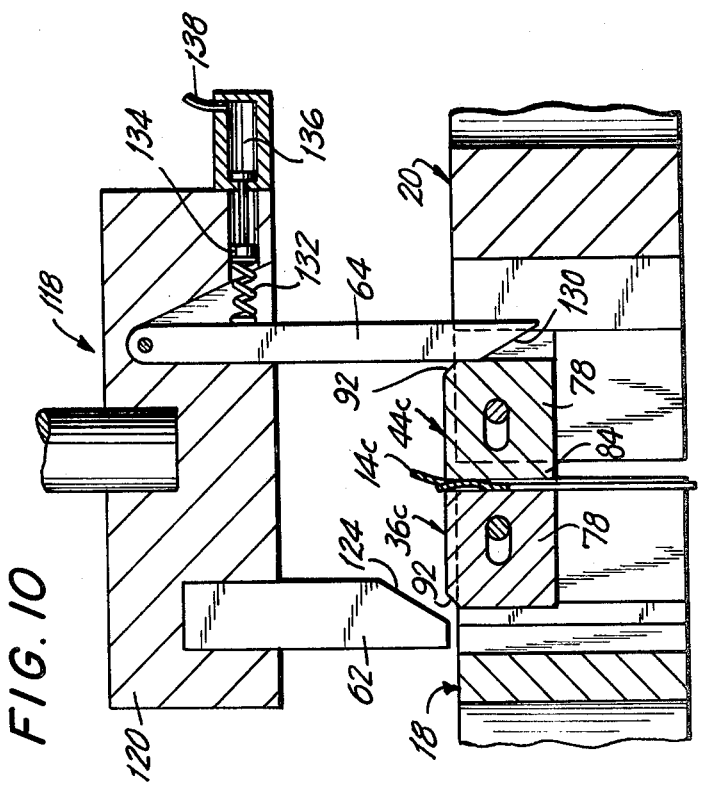
FIG. 10 is a section view taken along line 10—10 of FIG. 9.

Platen 120 descends during the lower half of the press cycle. Referring to FIGS. 9 and 10, it is seen that during the descent of platen 120, the cam surface 130 of second cam member 64 first contacts bevelled portion 92 of clamping assembly 44c thereby urging pusher member 78 of clamping assembly 44c into a forward position until the shoulder portion 84 thereof contacts second clip component 14c. At this time, the cam surface 124 of first cam member 62 is still located above and has not yet contacted clamping assembly 36c, second cam member 64 being maintained in its vertical orientation by the maintainance of pressure within hydraulic cylinder 136. This position is shown in FIGS. 9 and 10.

Figure 11:
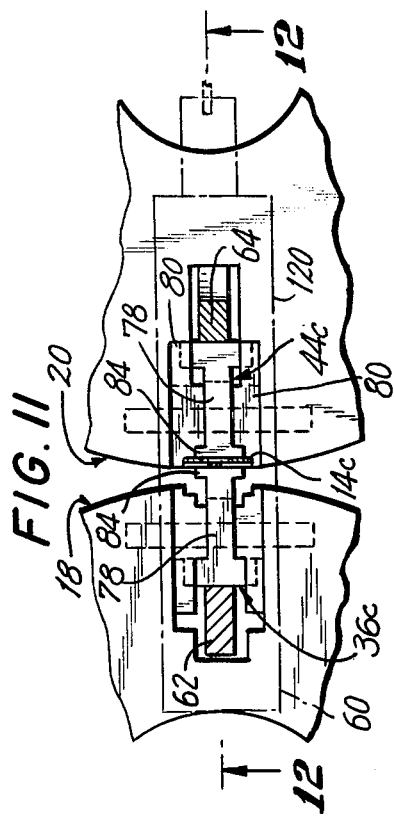
FIG. 11 is a plan view of a portion of the second and third dial members during transfer of the second clip component from the second to the third dial member.
Figure 12:
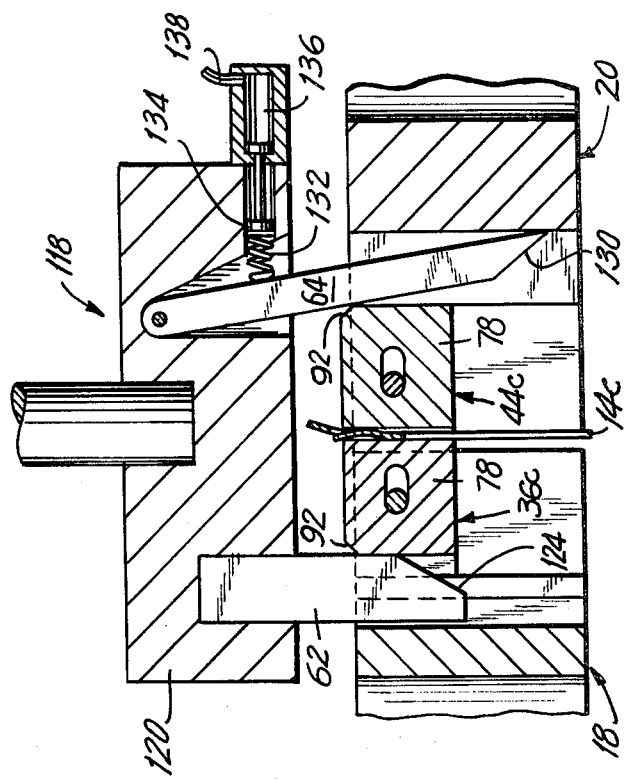
FIG. 12 is a section view taken along line 12—12 of FIG. 11.

Platen 120 continues to descend until cam surface 124 of first cam member 62 comes into contact with bevelled surface 92 of pusher member 78 of clamping assembly 36c. The continued downward movement of platen 120 results in cam member 62 moving pusher member 78 of clamping assembly 36c to the right together with pusher member 78 of clamping assembly 44c as seen in FIGS. 11 and 12. Clip component 14c is clamped between the shoulder portions 84 of the pusher members during this movement by virtue of the spring force being exerted by spring 132 which is still being held in position by piston 134. During this movement, second cam member 64 pivots rearwardly under the urging of cam member 62 against the resistance of spring 132. The continued downward movement of cam member 62 results in clip component being carried to the right as seen in FIGS. 11 and 12 until it is clamped within clamping assembly 44c and held therein under the action of springs 110 which urge clamping members 80 toward each other. Upon clip component 14c being clamped within clamping assembly 44c, a valve (not shown) disposed within pressure line 138 which communicates with hydraulic cylinder 136 is opened so that when platen 120 is elevated during the latter portion of the bottom half of the press cycle to the extent that cam member 62 no longer contacts clamping assembly 36c, there will be no force present by virtue of cam member 64 to move the clamping assemblies to the left as seen in FIGS. 11 and 12. Platen 120 returns to its elevated position at the completion of the bottom half of the press cycle whereupon the valve is closed returning cam member 64 to its vertical position. Thus, the second clip component 14c has been transferred from clamping assembly 36c in the second dial member 18 to clamping assembly 44c in the third dial member.

It should be noted that the pusher member 78 of clamping assembly 36c is returned to its retracted position during subsequent indexing of second dial member 18 through the action of a reciprocally mounted rod 74 (FIG. 1) as described above. It should also be noted that second clip component 14c has been reversed, i.e., the inwardly facing surface thereof when mounted in clamping assembly 36c is now the outwardly facing edge in clamping assembly 44c.

ASSEMBLY OF CLIP MEMBERS

Subsequent to transfer of the second clip component 14c from the second dial member clamping assembly 36c to the clamping assembly 44c of the third dial member 20, the annular member 16 and third dial member 20 continue to rotatably index with the continued cycling of the press until the respective clamping assemblies reach a position denoted as 26d, 44d, in FIG. 1, wherein the first clip component, designated 12d, is in opposed relationship to the second clip component, designated 14d. It is noted that in the present embodiment, the pair of clip components indexing into confronting relationship are not the original pair which were simultaneously punched from metallic stock. More specifically, the first clip component which was punched in the same cycle as the second clip component 14d has been assembled to another second clip component during the previous press cycle. Although this results in the first clip component formed during the first press cycle being wasted, all subsequent press cycles result in the assembly of two clip components into a clip.

Referring to FIG. 13, upon being indexed into assembly station 68, first clip component 12d is in a vertical orientation in clamping assembly 26d of annular member 16 by virtue of its engagement with cam surface 116 of cam member 114. It is noted however, that second clip component 14d upon being indexed to assembly station 68 has pivoted slightly beyond its vertical orientation in clamping assembly 44d. This is accomplished through the engagement of clamping assembly 44d with cam surface 142 of a cam member 140 whereby clamping assembly 44 is pivoted during the rotation of third dial member 20. Thus, the opposed clip components 12d, 14d define an upwardly tapering space between them which facilitates the elevation of apparatus for assembling the clip components from below into assembly position as described hereinbelow.

The assembly of the clip components, like the transfer of the second clip component, described above, takes place during the bottom half of the press cycle while the rotatable members are stationary. The mechanism by which the assembly apparatus is coupled to the press will be readily apparent to those having skill in the art.

The lower platen 144 of the die set which has been hollowed to receive the rotatable members as described above has a rectangular opening 146 formed therethrough which communicates between the space defined between the opposed annular and third dial members (including the area between cam members 114 and 140) and an area designated 148 below platen 144. A rocker member 150 is pivotally mounted within area 148 and includes an end portion 152 having an upper cam surface 154 aligned with opening 146.

Figure 15:
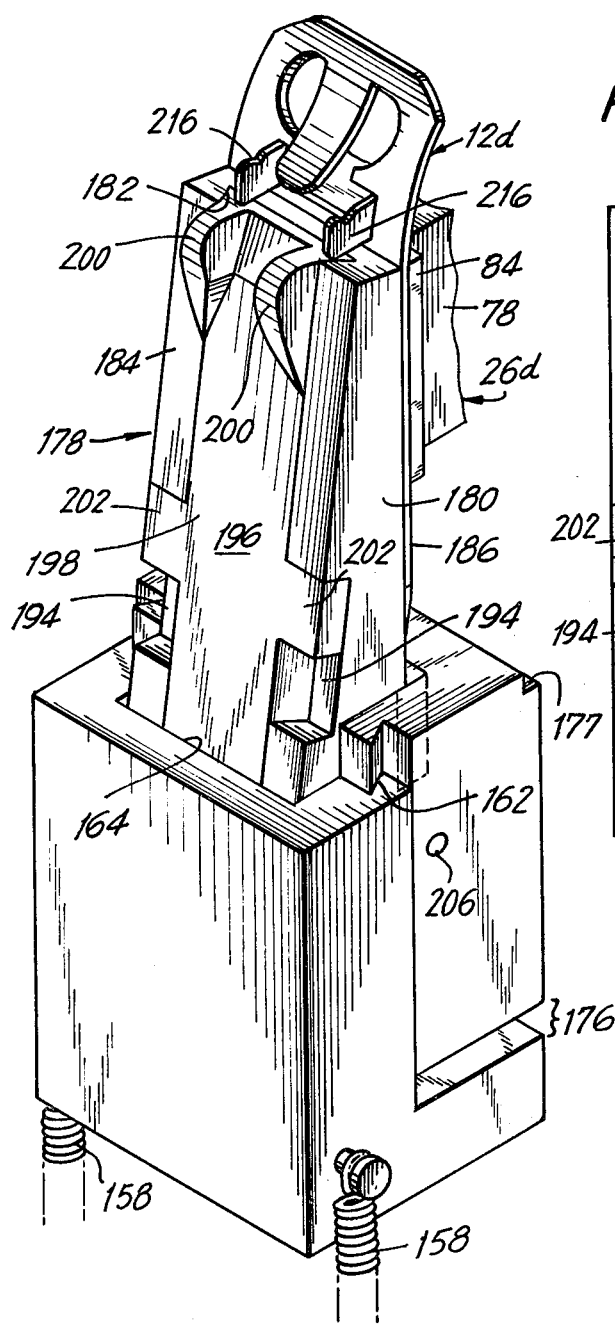
FIG. 15 is a persepctive view of the fixture assembly and carriage and follower members comprising part of the assembly apparatus of the present invention.

Referring to FIG. 15 in conjunction with FIG. 13, an L-shaped follower member 156 including an upwardly extending portion 156a and a laterally extending portion 156b is slidably positioned within opening 146 above rocker member 150. The follower member 156 is downwardly biased so that the lower surface of lateral portion 156b bears against cam surface 154 by a pair of springs 158, each of whose upper ends are engaged to follower member 156 and whose lower ends are connected to an extension 160 of platen 144. The vertically extending portion 156a of follower 156 is formed with a dovetail slot 162 (FIG. 15) extending over its entire length. Further, the upper portion of vertically extending follower portion 156a is cut away defining a cavity 164 terminating at a shoulder 166 (FIG. 13).

Journalled within dovetail slot 162 is a carriage member 168 which also is cut away at its upper end to form a cavity 170. A bore 172 (FIG. 13) is formed in the lower surface of carriage member 168 in which a spring 174 is disposed, the lower end of which extends beyond the lower surface of carriage member 168 and abuts against the upper surface of the lateral portion 156b of follower 156. Follower and carriage members 156 and 168 are slidably assembled to each other via the dovetail connection and the assembly is slidably located in the rectangular opening 146. Thus, when the free movement of follower member 156 and carriage member 168 is not obstructed, upward movement of follower 156 will result in the simultaneous movement of carriage member 168 therewith. A separation, denoted 176 (FIG. 13), however, is normally maintained between follower member 156 and carriage member 168 defined by the distance by which spring 174 extends below the lower surface of carriage member 168. A notch 177 is formed in the upper edge of carriage member 168 for purposes which will be made clearer hereinbelow.

Referring now to FIG. 13 in conjunction with FIGS. 15-18, a fixture assembly 178 is pivotally mounted at its lower end to carriage member 168 within cavity 170. More particularly, fixture assembly 178 includes a wedge shaped fixture member 180 having a dovetail slot 182 formed in it extending along its length. The angle between the opposite edge surfaces 184, 186 of fixture member 180 corresponds to the angle between the opposed first and second clip components as shown in FIG. 13. A shelf 188 (FIGS. 17 and 18) having an upper shoulder 190 is fixed to the edge surface 186 of fixture member 180 by a screw 192. A pair of slots 194 are formed in edge surface 184 of fixture member 180.

Figure 16:
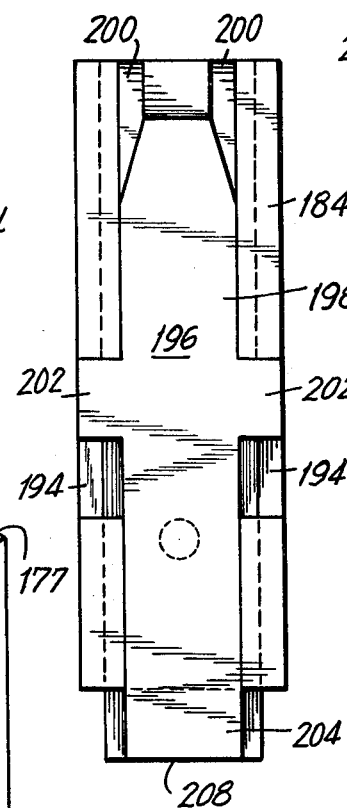
FIG. 16 is a front view of the fixture assembly of the assembly apparatus.
Figure 17:
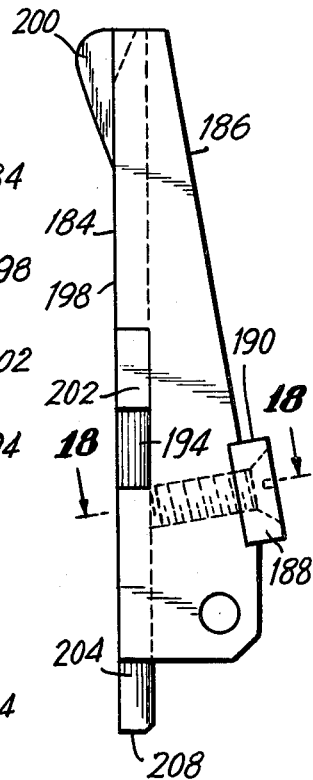
FIG. 17 is a side view of the fixture assembly.
Figure 18:
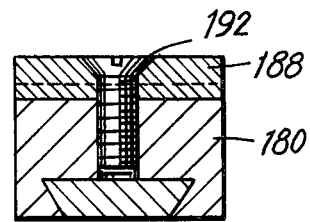
FIG. 18 is a section view taken along line 18—18 of FIG. 17.

Fixture assembly 178 further includes a slider member 196 slidably journalled within dovetail slot 182 of fixture member 180. The outwardly facing surface 198 of slider member 196 is substantially coplanar with the edge surface 184 of fixture member 180. A pair of spaced protuberances 200 are formed at the uppermost end of slider member 196 and a pair of flanges 202 extend laterally from the sides of slider member 196 into slots 194 of fixture member 180. Flanges 202 limit the extent of slidable movement of the slider member within the fixture member 180. When the slider member 196 is in its uppermost position relative to fixture member 180 (when flanges 202 abut the upper boundary of slots 194) as seen in FIGS. 15-17, a lower portion 204 of slider member 196 extends downwardly beyond the lowermost edge of the fixture member 180.

As seen in FIG. 13, the fixture assembly 178 is pivotally connected to carriage member 168 (extending between cavities 170 and 164 formed in the carriage and follower members) by a pin 206 which passes through fixture member 180. It is noted that in the normal position, the lower edge 208 of the lower portion 204 of slider member 196 is spaced from the shoulder 166 defining the lower surface of cavity 164.

Upon clamping assemblies 26d, 44d being indexed to station 68, the rocker 150 is in a position wherein end portion 152 is somewhat lower than that shown in FIG. 13. Accordingly, follower member 156, carriage member 168, and fixture assembly 178 are all displaced in a position lower than that shown in FIG. 13. Immediately after the clamping assemblies are indexed into assembly position and the top half of the press cycle completed, the rocker 150 is pivoted to the position shown in FIG. 13 raising the follower and carriage members 156, 168 and fixture assembly 178 to the position shown in FIG. 13 wherein the upper edge surface 210 of carriage member 168 touches the lower end of first clip component 12d thereby providing a supporting surface during its subsequent movement in connection with the assembly of the clip. It is also noted that the shoulder 190 of shelf member 188 is substantially flush with the upper edge surface 210 of carriage member 168. It is noted that the edge portion of the lower surface 209 of cam member 114 extends beyond the vertical surface of platen 144 and slightly overlaps over opening 146 and extends directly over the notch 177 formed in carriage member 168. Upon carriage member 168 reaching the position shown in FIG. 13, the edge surfaces 184 of fixture member 180 and 198 of slider member 196 which have been raised with carriage member 168 move into abutting relationship with the outwardly facing surface of second clip component 14d. By virtue of its pivotal connection to carriage member 168, the orientation of fixture assembly 178 accomodates itself to the precise orientation of clip component 14d.

A more detailed description of the first and second clip components 12, 14 is now set forth since the operation of the assembly apparatus being described depends to an extent on the structure of the clip components. As best seen in FIG. 20, the first clip component 12d includes a clip portion 212 and a pivot portion 214. For present purposes, pivot portion 214 includes a pair of laterally spaced ears 216, each ear having a rearwardly facing notch 218 formed therein. Second clip component 14d has a corresponding clip portion 220 and pivot portion 222. For present purposes, pivot portion 222 includes a pair of laterally spaced gaps 224, each gap being formed by a rearwardly extending forward arm 226 and a forwardly extending rearward arm 228. In order to assemble the two clip components, ears 216 of the first clip component must be received within the gaps 224 of the second clip component, the notches 218 receiving the ends of rearward arms 228 and the ends of arms 226 being appropriately deformed so at to capture the ears 216 within the gaps.

Although the details of the assembly structure are adapted for use in assembling clip components having the structure described above, it is understood that those skilled in the art can readily adapt the structure described in the present embodiment so as to render such structure capable of assembling clips or other assemblies having somewhat different configurations and such modifications would be within the scope of the present invention.

Thus, as described above, immediately subsequent to clamping assemblies 26d, 44d indexing into assembly station 68, the fixture assembly 178 is raised into the position shown in FIG. 13, whereupon slider member 196 abuts against the outwardly facing surface of second clip component 14d. The upwardly facing edges of the protuberances 200 on slider member 196 abut against the forward arms 226 of second clip component 14d.

Referring to FIGS. 13 and 14, simultaneously with the fixture assembly 178 moving into the position shown in FIG. 13, a pair of guide walls 230 fixed to a vertically reciprocally mounted plate 232 operably associated with the press descend and bridge the space between the clamping assemblies as best seen in FIG. 13. Downwardly and inwardly facing shoulders 234 as well as downwardly and rearwardly facing shoulder 236 are formed in guide walls 230. Plate 232 descends until the upper edge of second clip component 14d touches shoulders 234 while shoulders 236 just clear the upper edge surface of the clamping assembly 26d.

Referring to FIGS. 19 and 20, immediately after the fixture assembly moves into the position shown in FIG. 13, piston 70 is actuated and moves radially inwardly, its carriage 237 preferably being driven by a suitable cam attached to plate 232. The inner end of piston 70 enters ore 30 and contacts the outer end of stub rod 34 moving the latter toward clamping assembly 26d. Piston 70 moves a sufficient distance so that the inner end of stub rod 34 contacts pusher member 78 causing it to move to its extended position thereby moving the first clip component 12d (which is guided by guide walls 230) into contact with edge surface 186 of fixture member 180. Ears 216 of first clip component 12d are thereby located within gaps 224 of the second clip component 14d, as best seen in FIG. 20. Referring to FIG. 19, it is seen that the lower edge of first clip component 12d is supported during this movement by the upper edge surface 210 of carriage mamber 168 and shoulder 190 of shelf member 188.

Referring now to FIG. 21, immediately after the first clip component 12d is positioned in abutting relationship with edge surface 186 of fixture member 180 with the ears 216 entering gaps 224, rocker 150 continues to pivot in the direction of arrow 238 elevating follower member 156 and carriage member 168. As carriage member 168 is elevated, the fixture member 180 is also elevated thereby raising the first clip component 12d via shoulder 190 of shelf 188. The extent of upward movement of carriage member 168 and, therefore, the extent of upward movement of first clip component 12d, is precisely controlled by virtue of the interference of the shoulder defined by notch 177 with the overlapping edge portion of lower surface 209 of cam member 114. Thus, as seen in FIG. 21, the upward movement of carriage member 168 (and first clip component 12d) terminates upon notch 177 engaging the edge portion of lower cam member surface 209.

This controlled upward movement of first clip component 12d causes the notches 218 in the ears 216 of first clip component 12d to approach and finally receive the ends of rearward arms 228 of second clip component 14d as seen in FIG. 21. Since second clip component 14d is firmly gripped in clamping assembly 44d, it remains in place while this elevation takes place. Further, as notches 218 approach arms 228, shoulders 234 on guide walls 230 prevent second clip component 14d from moving and, additionally, fix the clip component in place during the final assembly steps described below.

Referring to FIGS. 19-21, it is seen that during the upward movement of carriage member 168, the protuberances 200 at the uppermost end of slider member 196 abut the forward arms 226 of second clip component 14d. Thus, as carriage member 168 moves upwardly, slider member 196 remains stationary or, in other words, slides rearwardly with respect to fixture member 180, by virtue of second clip component 14d being held in place. The clearance provided between the lower edge 208 of the lower portion 204 of slider member 196 and shoulder 166 of follower member 156 allows slider member 196 to remain stationary. Thus, as seen in FIGS. 20-21, slots 194 of fixture member 180 move upwardly relative to flanges 202 of slider member 196 during the upward movement of carriage member 168.

Rocker 150 continues to pivot in the direction of arrow 238. Although carriage member 168 is restrained in position by surface 209, follower member 156 continues to move upwardly by virtue of the separation 176 between follower member 156 and carriage member 168. Upon continued elevation of follower member 156, the lower edge 208 of the slider lower portion 204 is contacted by shoulder 166 of follower member 156, as seen in FIG. 21 which pushes slider member 196 upwardly with respect to fixture member 180 which remains stationary, flanges 202 sliding upwardly within slots 194.

Since the second clip component is being held in place by shoulders 234 of guide walls 230, the continued upward movement of slider member 196 causes protuberances 200 to move upwardly against and deform the forward arms 226. More particularly, referring to FIGS. 22 and 23, slider member 196 moves upwardly causing protuberances 200 to deform arms 226 rearwardly setting the arms against the forward edges of ears 216 thereby capturing the ears within gaps 224 of the second clip component 14d. Preferably, pusher member 78 of clamping assembly 26d simultaneously delivers a setting pressure toward the left (as seen in FIG. 23) which completes the capture of the ears within the respective gaps.

The rocker arm 150 then begins to pivot in the opposite direction thereby allowing slider member 196 to descend. Upon continued pivoting of rocker 150 in the downward direction, the fixture assembly is removed from the space between the assembled clip components. The assembled clip is now held in clamping assembly 44d.

FINISHING OPERATIONS AND EJECTION

The entire assembly operation described above occurs during the lower half of one cycle of the press. Thus, as one cycle is completed and the next begun, first annular member 16 and second and third dial members 18, 20 rotatably index to their next position. Thus, referring to FIG. 1, an assembled clip, designated 240 is carried by a clamping member 44d to the next succeeding positions designated 44e and 44f by third dial member 20. While assembled clip 240 is held in position 44e, it may be subjected to any post-assembly operations, such as inspecion and burr removal.

Referring to FIG. 1, in conjunction with FIG. 24, upon the assembled clip containing clamping assembly 44 reaching the position designated 44f, and during the lower half of the press cycle, a cam member 73 vertically aligned with beveled portion 92 of pusher member 78 descends and urges pusher member 78 to its extended position thereby ejecting clip 240 from clamping assembly 44f, preferably into a container. At the conclusion of the punching operation, cam member 73 is elevated until the next indexing occurs. Pusher member 78 is then retracted by suitable means, such as a reciprocating rod 75 at the next position, denoted 44g. Similarly, pusher member 78 of the clamping assembly 26 of first annular member 16 is moved to its retracted position by a reciprocating rod 73 (FIG. 1) at the position designated 26e.

Thus it is seen that the present invention provides an apparatus and method for manufacturing a completely assembled article at a high rate of speed (such as over 100 assembled clips per minute). By automatically locating the clip components after punching into assembly capable positions, the difficult and expensive problem of handling individual clip components is eliminated. Further, in the present case where the clip components are punched from a single sheet of metallic stock material wherein the clip components are interlocked with each other, the first side of one of the clip components (the second clip component) which when initially received and held in the second dial member 18 is on the wrong side for automatic assembly. However, by transferring the second clip component from the second dial member 18 to the third dial member 20, this clip component is reversed so that upon the clip components subsequently coming into opposed relationship at assembly station 68, all major burrs are on the outside of the second clip components thereby being capable of being removed by a subsequent tumbling operation. Of course, in the present embodiment, the reversal of the second clip component properly locates the gap defining arms so that the latter may be deformed to capture the ears. When the present invention is used in constructing articles formed from the same metallic stock, a balanced inventory is achieved.

Obviously, numerous modifications and variations of the present invention are possible in the light of the above teaching. For example, the assembly apparatus may be modified depending upon the particular nature of the pivot portions of the clip or other articles being assembled. The apparatus may be modified to permit the assembly of clips to occur in the first annular member clamping assemblies. In this case, the assembled clips would then subsequently index through a greater number of positions on the annular member thereby permitting a larger number of secondary or auxiliary post assembly operations to be accomplished prior to ejection of the completed clip. Further, the present invention may be utilized in the manufacture of articles having more than two components. Of course, the present invention may be utilized in conjunction with press apparatus employing two dies which stamp components having varying thicknesses and/or grain direction. It is therefore to be understood that within the scope of the appended claims, the invention may be practiced otherwise than as specifically described herein.

I claim:

1. Apparatus for automatically manufacturing articles including first and second components, such as clips, comprising:

a rotatably mounted first annular or dial member having an upper edge surface, an outer edge surface and an inner edge surface defining an inner area, and a plurality of first component clamping assemblies mounted thereon and spaced therearound, said first annular or dial member sequentially receiving at a receiving station and releasably holding a plurality of first components and sequentially indexing each of said first components to an assembly station;

a second dial member having outer and upper edge surfaces, said second dial member being rotatably mounted within said inner area and having a plurality of second component clamping assemblies mounted thereon and spaced therearound, said second dial member sequentially receiving at said receiving station and releasably holding a plurality of second components and sequentially indexing each of said second components to a transfer station;

a third dial member having outer and upper edge surfaces, said third dial member being rotatably mounted within said inner area and having a plurality of second component clamping assemblies mounted thereon and spaced therearound, said third dial member sequentially receiving said plurality of second components at said transfer station and releasably holding and sequentially indexing said second components to said assembly station into confronting relationship with corresponding ones of said first components;

means for sequentially transferring said second components from said second dial member clamping assemblies to said third dial member clamping assemblies; and means located at said assembly station for sequentially assembling each pair of confronting first and second components to each other to form said article.

2. Apparatus as recited in claim 1 wherein the centers of rotation of said second and third dial members lie substantially on a diameter of said first annular member.

3. Apparatus as recited in claim 1 wherein said first annular member is rotatably mounted adjacent to said receiving and assembly stations, said second dial member is rotatably mounted adjacent to said receiving and transfer stations, and said third dial member is rotatably mounted adjacent to said transfer and assembly stations, whereby upon rotation of said annular member, said clamping assemblies mounted thereon sequentially index adjacent to said receiving and assembly stations and upon rotation of said second dial member, said clamping assemblies mounted thereon sequentially index adjacent to said receiving and transfer stations, and upon rotation of said third dial member, said clamping assemblies mounted thereon sequentially index adjacent to said transfer and assembly stations.

4. Apparatus as recited in claim 1 wherein said clamping assemblies each include a pair of spaced, opposed wall members having first and second opposed portions for gripping a respective one of said first or second components, means for biasing said opposed wall members toward each other, and a pusher member interposed between said opposed wall members mounted for movement from a retracted position rearward of said opposed component gripping portions to an extended position forward of said opposed component gripping portion.

5. Apparatus as recited in claim 4 wherein a plurality of cavities are formed in each of said first annular and second and third dial members, said clamping assemblies mounted on each of said respective first, second and third members each being mounted within one of said cavities.

6. Apparatus as recited in claim 5 wherein each of said first component clamping assemblies mounted on said first annular member is pivotally mounted within its respective cavity, said clamping assembly being pivotable between a first receiving position wherein said opposed component gripping portions are substantially parallel to said first annular member upper edge surface and a second assembly position wherein said opposed component gripping portions are substantially parallel to said first annular member inner edge surface, and further including means for pivoting said first component clamping assembly from said first position at said receiving station to said second position at said assembly station.

7. Apparatus as recited in claim 5 wherein each of said second component clamping assemblies mounted on said second dial member is pivotally mounted within its respective cavity, said clamping assembly being pivotable between a first receiving position wherein said opposed component gripping portions are substantially parallel to said second dial member upper edge surface and a second transfer position wherein said opposed component gripping portions are substantially parallel to said second dial member outer edge surface, and further including means for pivoting said second component clamping assembly from said first position at said receiving station to said second position at said transfer station.

8. Apparatus as recited in claim 5 wherein each of said second component clamping assemblies mounted on said third dial member is pivotally mounted within its respective cavity, said clamping assembly being pivotable between a first transfer position wherein said opposed component gripping portions are substantially parallel to said third dial member outer edge surface and a second assembly position wherein the plane of said opposed gripping portions forms an acute angle with said outer edge surface.

9. Apparatus as recited in claim 6 wherein each of said second component clamping assemblies mounted on said second dial member is pivotally mounted within its respective cavity, said clamping assembly being pivotable between a first receiving position wherein said opposed component gripping portions are substantially parallel to said second dial member upper edge surface and a second transfer position wherein said opposed component gripping portions are substantially parallel to said second dial member outer edge surface, means for pivoting said second component clamping assembly from said first position at said receiving station to said second position at said transfer station, and further wherein each of said second component clamping assemblies mounted on said third dial member is pivotally mounted within its respective cavity, said clamping assembly being pivotable betwwen a first transfer position wherein said opposed component gripping portions are substantially parallel to said third dial member outer edge surface and a second assembly position wherein the plane of said opposed gripping portions forms an acute angle with said outer edge surface.

10. Apparatus as recited in claim 9 wherein said means for transferring said second components from said second means to said third means at said transfer station comprises first means for moving said pusher member in said third dial member clamping assembly located at said transfer station from said retracted position to said extended position to contact a second component held in said second dial member clamping assembly located at said transfer station and second means for moving said pusher member in said second dial member clamping assembly from said retracted to said extended position with said second component being held between respective pusher members while said pusher member in said third dial member clamping assembly is retracted.

11. Apparatus as recited in claim 10 wherein said first pusher moving means includes a first substantially vertically oriented elongate cam member mounted at said transfer station for reciprocating movement in overlying relationship to said pusher member in said third dial member clamping assembly and said second pusher moving means includes a second substantially vertically oriented elongate cam member mounted for reciprocating movement at said transfer station in overlying relationship to said pusher member in siad second dial member clamping assembly, whereby in the transfer of a second component from a second dial member clamping assembly to a third dial member clamping assembly, said first cam member moves downwardly into contact with a camming surface on said pusher member in said third dial member clamping assembly urging said pusher member from its retracted position to its extended position to contact a second component held in said second dial member clamping assembly, whereupon said second cam member moves downwardly into contact with a camming surface on said pusher member in said third dial member clamping assembly urging said pusher member from its retracted position to its extended position with said second component being held between said respective pusher members while said pusher member in said third dial member clamping assembly is retracted.

12. Apparatus as recited in claim 11 wherein said transfer means further comprises a platen member mounted at said transfer station for vertical reciprocating movement, said first elongate cam member having one end pivotally mounted to said platen member, means for selectively biasing said first elongate cam member into either a substantially vertical orientation or a freely pivotable mode, said second elongate cam member having one end fixed to said platform member, and said first elongate cam member being greater in length than said second elongate cam member so that the free end of said first elongate cam member extends beyond the free end of said second elongate cam member.

13. Apparatus as recited in claim 9 wherein said means for pivoting said first component clamping assembly includes a first rod member reciprocally mounted adjacent said inner edge surface of said first annular member between said receiving and assembly stations and said means for pivoting said second component clamping assembly includes a second rod member reciprocally mounted adjacent said outer edge surface of said second dial member between said receiving and transfer stations.

14. Apparatus as recited in claim 9 wherein said means for assembling the pairs of confronting first and second components include a fixture assembly having a pair of opposed surfaces movably located between said clamping assemblies of said first annular member and third dial member at said assembly station, means for locating one of said opposed surfaces of said fixture assembly into contiguous relationship with said second component, means for moving said first component from said first annular member clamping assembly into contiguous relationship with the other of said opposed surfaces of said fixture assembly whereby a portion of said second component engages a corresponding portion of said first component, and means for fastening said first and second components together.

15. Apparatus as recited in claim 10 wherein said fixture assembly is selectively movable from a first position below a space defined between said confronting first and second components to a second position within said space and includes an elongate fixture member having opposed longitudinal edge surfaces and an elongate slider member having an outer surface, said slider member being slidably mounted on said fixture member, said means for locating one of said opposed fixture assembly surfaces includes means for elevating said fixture assembly from said first position to said second position so that said slider member outer surface becomes contiguous with said second component, said fixture assembly elevating means including means for elevating said slider member relative to said fixture member.

16. Apparatus as recited in claim 15 further including a shoulder portion provided on the other of said fixture member opposed surfaces, said shoulder portion adapted to engage and raise said first component subsequent to its movement into contiguous relationship with the other of said fixture member opposed surfaces.

17. Apparatus as recited in claim 15 wherein forming portions are provided on said slider, said forming portions being adapted to engage and deform a portion of said second component upon elevation of said slider member.

18. Apparatus as recited in claim 15 wherein said fixture assembly elevating means includes a pivotally mounted rocker member, a movably mounted follower member engaged to said rocker member, said follower member including means for engaging said slider member upon said follower member being elevated a predetermined distance in response to pivoting of said rocker member, and a carriage member yieldingly engaged to and elevatable relative to said follower member, said fixture member being coupled to said follower member for elevation therewith.

19. Apparatus as recited in claim 18 wherein said carriage member is yieldingly engaged to said follower member by a spring member interposed therebetween and further including means for preventing the elevation of said carriage member beyond a predetermined point, said follower member being adapted to continue elevation subsequent to said carriage member reaching said predetermined point, whereby said means for engaging said slider member engages said slider member to elevate the same.

20. Apparatus as recited in claim 14 wherein said means for moving said first component from said first annular member clamping assembly into contiguous relationship with the other of said opposed surfaces of said fixture assembly includes a plurality of bores radially formed in said first annular member, each bore having first and second ends opening into a respective clamping assembly cavity and the outer edge surface of said first annular member respectively, a plurality of stub rods, each stub rod being slidably located within a respective bore, one end of said stub rod being in confronting relationship to said clamping assembly pusher member when said clamping assembly is in said second assembly position and the other end of said stub rod being located in the substantial area of the second end of said bore, and piston means mounted adjacent the outer edge surface of said first annular member at said assembly station for urging a stub rod located at said assembly station radially inwardly whereby said stub rod urges said pusher member inwardly thereby moving said first component from said first annular member into contiguous relationship with the other of said fixture member opposed surfaces.

21. Apparatus as recited in claim 14 wherein said assembly means further includes a guide assembly mounted at said assembly station for reciprocable vertical movement, said guide assembly including a pair of opposed guide wall members, each guide wall member bridging the space between said fixture assembly and said first annular member clamping assembly.

22. Apparatus for automatically manufacturing clips including first and second clip components comprising:
   die means for forming said first and second clip components from metallic stock;
   first means for receiving and holding said first clip components in a horizontal attitude and for pivoting said first clip component into a vertical attitude;
   second means for receiving and holding said second clip components in a horizontal attitude and for pivoting said second clip component into a vertical attitude;
   third means for reversing the vertical attitude about a vertical axis of each of said second clip components and for moving each of said second clip components into confronting relationship with a respective one of said first clip components; and
   means for assembling each pair of confronting first and second clip components to each other.

* * * * *